United States Patent
Mejdrich et al.

(10) Patent No.: US 8,330,765 B2
(45) Date of Patent: Dec. 11, 2012

(54) ROLLING CONTEXT DATA STRUCTURE FOR MAINTAINING STATE DATA IN A MULTITHREADED IMAGE PROCESSING PIPELINE

(75) Inventors: Eric Oliver Mejdrich, Rochester, MN (US); Paul Emery Schardt, Rochester, MN (US); Robert Allen Shearer, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1309 days.

(21) Appl. No.: 12/046,573

(22) Filed: Mar. 12, 2008

(65) Prior Publication Data
US 2009/0231349 A1 Sep. 17, 2009

(51) Int. Cl.
G06F 15/80 (2006.01)
G06F 15/00 (2006.01)
G06T 1/00 (2006.01)
(52) U.S. Cl. ........................ 345/505; 345/501
(58) Field of Classification Search .................. 345/506, 345/501, 505
See application file for complete search history.

(56) References Cited

U.S. PATENT DOCUMENTS
2007/0113055 A1* 5/2007 Dale et al. ..................... 712/228
2009/0153571 A1* 6/2009 Crow et al. ................... 345/506

* cited by examiner

*Primary Examiner* — Jacinta M Crawford
(74) *Attorney, Agent, or Firm* — Wood, Herron & Evans, LLP

(57) ABSTRACT

A multithreaded rendering software pipeline architecture utilizes a rolling context data structure to store multiple contexts that are associated with different image elements that are being processed in the software pipeline. Each context stores state data for a particular image element, and the association of each image element with a context is maintained as the image element is passed from stage to stage of the software pipeline, thus ensuring that the state used by the different stages of the software pipeline when processing the image element remains coherent irrespective of state changes made for other image elements being processed by the software pipeline. Multiple image elements may therefore be processed concurrently by the software pipeline, and often without regard for synchronization or serialization of state changes that affect only certain image elements.

25 Claims, 7 Drawing Sheets

ROLLING CONTEXT DATA STRUCTURE FOR MAINTAINING STATE DATA IN A MULTITHREADED IMAGE PROCESSING PIPELINE

FIELD OF THE INVENTION

The invention is generally related to data processing, and in particular to graphical imaging processing and rendering.

BACKGROUND OF THE INVENTION

The process of rendering two-dimensional images from three-dimensional scenes is commonly referred to as image processing. As the modern computer industry evolves image processing evolves as well. One particular goal in the evolution of image processing is to make two-dimensional simulations or renditions of three-dimensional scenes as realistic as possible. One limitation of rendering realistic images is that modern monitors display images through the use of pixels.

A pixel is the smallest area of space which can be illuminated on a monitor. Most modern computer monitors will use a combination of hundreds of thousands or millions of pixels to compose the entire display or rendered scene. The individual pixels are arranged in a grid pattern and collectively cover the entire viewing area of the monitor. Each individual pixel may be illuminated to render a final picture for viewing.

One technique for rendering a real world three-dimensional scene onto a two-dimensional monitor using pixels is called rasterization. Rasterization is the process of taking a two-dimensional image represented in vector format (mathematical representations of geometric objects within a scene) and converting the image into individual pixels for display on the monitor. Rasterization is effective at rendering graphics quickly and using relatively low amounts of computational power; however, rasterization suffers from several drawbacks. For example, rasterization often suffers from a lack of realism because it is not based on the physical properties of light, rather rasterization is based on the shape of three-dimensional geometric objects in a scene projected onto a two dimensional plane. Furthermore, the computational power required to render a scene with rasterization scales directly with an increase in the complexity of the scene to be rendered. As image processing becomes more realistic, rendered scenes also become more complex. Therefore, rasterization suffers as image processing evolves, because rasterization scales directly with complexity.

Several alternative techniques rendering a real world three-dimensional scene onto a two-dimensional monitor using pixels have been developed based upon more realistic physical modeling. One such physical rendering technique is called ray tracing. The ray tracing technique traces the propagation of imaginary rays, rays which behave similar to rays of light, into a three-dimensional scene which is to be rendered onto a computer screen. The rays originate from the eye(s) of a viewer sitting behind the computer screen and traverse through pixels, which make up the computer screen, towards the three-dimensional scene. Each traced ray proceeds into the scene and may intersect with objects within the scene. If a ray intersects an object within the scene, properties of the object and several other contributing factors are used to calculate the amount of color and light, or lack thereof, the ray is exposed to. These calculations are then used to determine the final color of the pixel through which the traced ray passed.

The process of tracing rays is carried out many times for a single scene. For example, a single ray may be traced for each pixel in the display. Once a sufficient number of rays have been traced to determine the color of all of the pixels which make up the two-dimensional display of the computer screen, the two dimensional synthesis of the three-dimensional scene can be displayed on the computer screen to the viewer.

Ray tracing typically renders real world three-dimensional scenes with more realism than rasterization. This is partially due to the fact that ray tracing simulates how light travels and behaves in a real world environment, rather than simply projecting a three-dimensional shape onto a two dimensional plane as is done with rasterization. Therefore, graphics rendered using ray tracing more accurately depict on a monitor what our eyes are accustomed to seeing in the real world.

Furthermore, ray tracing also handles increases in scene complexity better than rasterization as scenes become more complex. Ray tracing scales logarithmically with scene complexity. This is due to the fact that the same number of rays may be cast into a scene, even if the scene becomes more complex. Therefore, ray tracing does not suffer in terms of computational power requirements as scenes become more complex as rasterization does.

One major drawback of ray tracing, however, is the large number of calculations, and thus processing power, required to render scenes. This leads to problems when fast rendering is needed. For example, when an image processing system is to render graphics for animation purposes such as in a game console. Due to the increased computational requirements for ray tracing it is difficult to render animation quickly enough to seem realistic (realistic animation is approximately twenty to twenty-four frames per second).

With continued improvements in semiconductor technology in terms of clock speed and increased use of parallelism; however, rasterization becomes viable for more complex images, and real time rendering of scenes using physical rendering techniques such as ray tracing becomes a more practical alternative to rasterization. At the chip level, multiple processor cores are often disposed on the same chip, functioning in much the same manner as separate processor chips, or to some extent, as completely separate computers. In addition, even within cores, parallelism is employed through the use of multiple execution units that are specialized to handle certain types of operations. Hardware-based pipelining is also employed in many instances so that certain operations that may take multiple clock cycles to perform are broken up into stages, enabling other operations to be started prior to completion of earlier operations. Multithreading is also employed to enable multiple instruction streams to be processed in parallel, enabling more overall work to performed in any given clock cycle.

Irrespective of whether raster-based or physical rendering is performed to render image data for a scene, the increased use of parallelism presents some challenges with respect to maintaining a coherent state in a parallelized, multithreaded architecture. As an example, conventional graphics software Application Programming Interfaces (API's), which are the libraries of routines that are called by application programs to control the rendering process (e.g., OpenGL™ and DirectX™), are not specifically designed to manage state data in a multithreaded environment. Single threaded graphics code (from the perspective of an application program) assumes a single coherent state for each operation, and as such, conventional graphics software API's typically expect function call execution to remain in order, which in turn requires intermixed state variables function calls and drawing function calls to remain in order.

As an example, a single threaded application program might make the following function calls when drawing a primitive:

```
glBegin(GL_TRIANGLES);
    glColor(0,255,0,255); // set color to green
    glVertex3f(100.0f, 100.0f, 0.0f);
    glColor(0,0,255,255); // set color to blue
    glVertex3f(150.0f, 100.0f, 0.0f);
    glColor(255,0,0,255); // set color to red
    Vertex3f(125.0f, 50.0f, 0.0f);
glEnd( );
```

In this code, each vertex of a triangle, which is defined by the glVertex3f( ) function call, is set to a different color by virtue of the preceding glColor( ) function call. The first vertex is thus set to green, the second vertex is set to blue, and the third vertex is set to red.

In a single-threaded hardware environment, processing of the aforementioned code is presents no coherency problems, as the first vertex will be defined after the color is set to green, and the second vertex will be defined after the color has been changed to blue, as a result of the preceding glColor( ) function call. The change in state, from a vertex color of green to a vertex color of blue, is ensured as a result of the serial processing of the function calls in the code.

In a multithreaded hardware environment, however, it may be desirable to enable different function calls to be handled in parallel hardware threads to increase overall throughput, desirably without requiring any specific thread management from an application program. Based on thread workload, however, the order in which certain function calls are completed in different threads may not be guaranteed, resulting in potential coherency issues.

As a consequence, in the aforementioned code, the use of parallelization may provide the opportunity to define each vertex for the primitive in separate threads, thus shortening the time required to define the primitive. The vertex color, however, represents a shared state or context, since setting the color with a glColor( ) function call sets the color used for all subsequent function calls until the color is changed by another glColor( ) function call. Steps therefore must be taken to ensure, for example, that the vertex color applied to each vertex is correct according to the function calls issued by the application program. Otherwise, as an example, the second glColor( ) function call that changes the vertex color from green to blue could potentially change the vertex color before the first vertex is defined by the first glVertex( ) function call, resulting in the first vertex being set to the wrong color.

While synchronization may be used to serialize operations to maintain coherent state, doing so limits the potential performance gains that could otherwise be obtained as a result of parallelization, particularly if a certain thread is required to wait for other threads to reach certain points before that thread is able to proceed. A need therefore exists in the art for an improved manner of maintaining coherent state data in a multithreaded graphics processing architecture.

SUMMARY OF THE INVENTION

The invention addresses these and other problems associated with the prior art by providing a multithreaded rendering software pipeline architecture that utilizes a rolling context data structure to store multiple contexts that are associated with different image elements that are being processed in the software pipeline. Each context stores state data for a particular image element, and the association of each image element with a context is maintained as the image element is passed from stage to stage of the software pipeline, thus ensuring that the state used by the different stages of the software pipeline when processing the image element remains coherent irrespective of state changes made for other image elements being processed by the software pipeline. Multiple image elements may therefore be processed concurrently by the software pipeline, and often without regard for synchronization or serialization of state changes that affect only certain image elements.

Consistent with one aspect of the invention, a circuit arrangement and method utilize hardware logic configured to host a multithreaded rendering software pipeline using a plurality of parallel threads of execution, where the multithreaded rendering software pipeline includes a plurality of stages configured to process a plurality of image elements to render an image in a buffer. A rolling context data structure accessible by the plurality of stages in the multithreaded rendering software pipeline is used, where the rolling context data structure is configured to store a plurality of contexts, and where each context is configured to store state data for at least one image element as the at least one image element is processed by the plurality of stages of the multithreaded rendering software pipeline. Each image element is associated with a context in the rolling context data structure such that state data in a first context that is associated with a first image element is unaltered responsive to a change made to state data in a second context that is associated with a second image element during processing of the second image element by the multithreaded rendering software pipeline.

Consistent with another aspect of the invention, an image is rendered in a buffer using a plurality of stages from a multithreaded rendering software pipeline executing on hardware logic that includes a plurality of parallel threads of execution. A first command associated with a first image element from among the plurality of image elements is received, where the first image element is associated with a first context from among a plurality of contexts in a rolling context data structure accessible by the plurality of stages in the multithreaded rendering software pipeline, and where the first context stores state data for the first image element. A determination is made if the first command uses the first context, and if so, the first context is marked as being in use. A second command associated with a second image element from among the plurality of image elements that is initially associated with the first context is received, and a determination is made if the second command attempts to modify state data in the first context and if the first context is marked as being in use. If so, state data is copied from the first context to a second context, the second image element is associated with the second context, and the state data in the second context is modified.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

DETAILED DESCRIPTION

Figure 1:
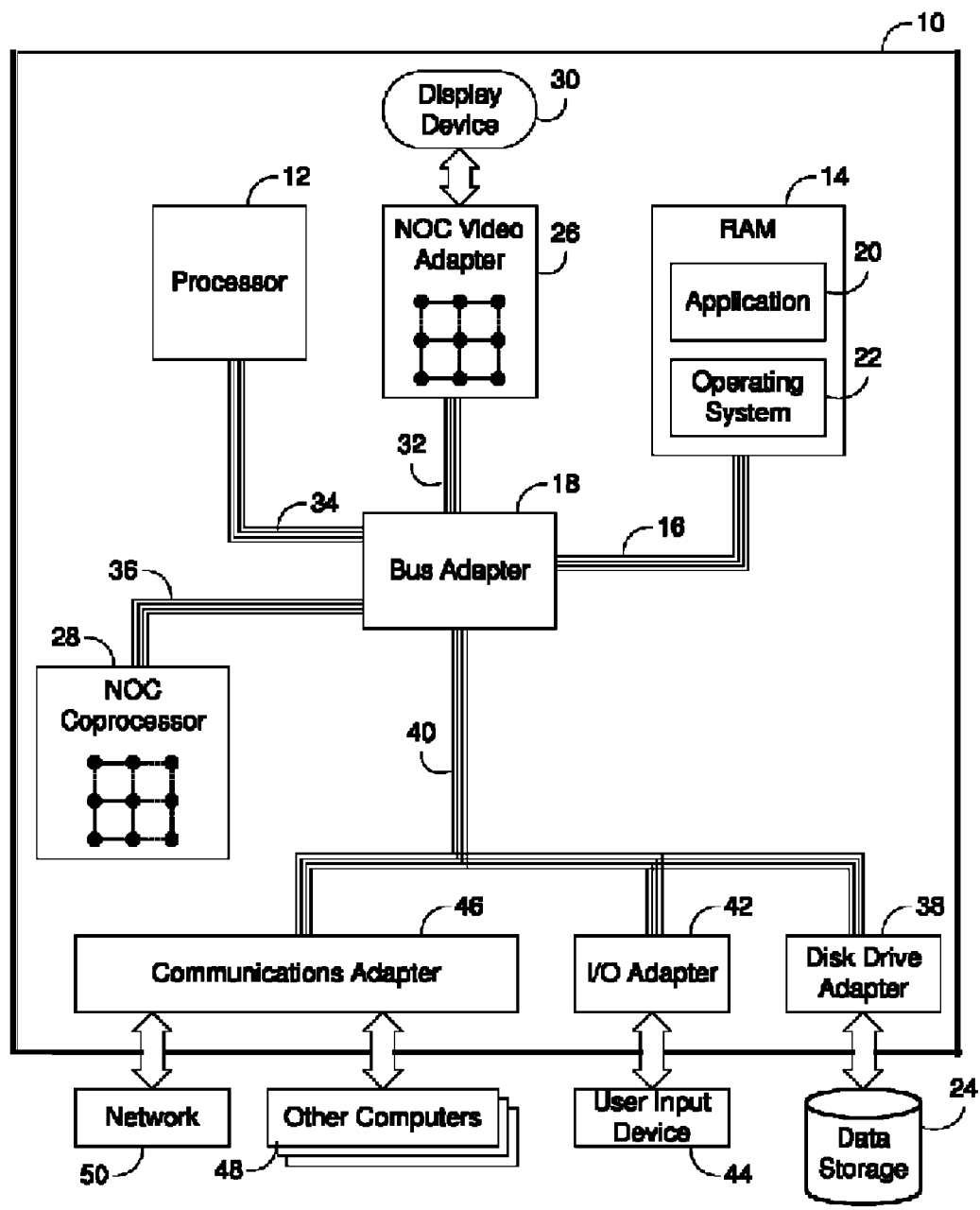
FIG. 1 is a block diagram of exemplary automated computing machinery including an exemplary computer useful in data processing consistent with embodiments of the present invention.

Embodiments consistent with the invention utilize a multithreaded rendering software pipeline architecture with a rolling context data structure that is used to store multiple contexts that are associated with different image elements that are being processed in the software pipeline. Each context stores state data for a particular image element, and the association of each image element with a context is maintained as the image element is passed from stage to stage of the software pipeline, thus ensuring that the state used by the different stages of the software pipeline when processing the image element remains coherent irrespective of state changes made for other image elements being processed by the software pipeline. As such, state data in one context that is associated with one image element is typically unaltered responsive to a change made to state data in another context that is associated with another image element during processing of the other image element by the multithreaded rendering software pipeline.

A context is typically associated with one or more image elements, e.g., primitives, vertices, objects, etc., to be placed in a rendered image, and is used to maintain a coherent stage for those image elements as operations are performed on those image elements during different stages of a software pipeline. A context is typically not streamed between stages of a pipeline, but is instead retained in a shared memory that is accessible by the stages of the pipeline. Image elements that are processed separately through the software pipeline may share the same context so long as the image elements all share the same state; however, desirably whenever the state needs to change for a particular image element as it is processed in the software pipeline, and that change in state does not apply to other image elements being processed by the pipeline, the state may be copied into a new context that is subsequently used for that image element, with the original context retained for use with the other image elements. As a result, separate states are effectively maintained for different image elements as the image elements are processed in the pipeline, which reduces synchronization and/or context contention concerns in the pipeline, and enables image elements to be processed in a more parallel and independent fashion. When combined with a highly parallel multithreaded software rendering pipeline, a higher throughput of image elements typically may be obtained.

The state data that may be maintained in a context may include any attributes or data that is indicative of a state or context that is desirably retained for an image element or group of image elements as the element or group is passed through the stages of a software rendering pipeline. For example, the state data stored in each context may include attributes such as pointers to color buffers, pointers to sphere maps, pointers to texture maps, rotation attributes, lighting attributes, blending attributes, screen offsets, and combinations thereof. This list is not exhaustive, and as such, the invention should not be limited to the particular attributes described herein.

Other variations and modifications will be apparent to one of ordinary skill in the art. Therefore, the invention is not limited to the specific implementations discussed herein.

Hardware and Software Environment

Now turning to the drawings, wherein like numbers denote like parts throughout the several views, FIG. 1 illustrates exemplary automated computing machinery including an exemplary computer 10 useful in data processing consistent with embodiments of the present invention. Computer 10 of FIG. 1 includes at least one computer processor 12 or 'CPU' as well as random access memory 14 ('RAM'), which is connected through a high speed memory bus 16 and bus adapter 18 to processor 12 and to other components of the computer 10.

Stored in RAM 14 is an application program 20, a module of user-level computer program instructions for carrying out particular data processing tasks such as, for example, word processing, spreadsheets, database operations, video gaming, stock market simulations, atomic quantum process simulations, or other user-level applications. Also stored in RAM 14 is an operating system 22. Operating systems useful in connection with embodiments of the invention include UNIX™, Linux™, Microsoft Windows XP™, AIX™, IBM's i5/OS™, and others as will occur to those of skill in the art. Operating system 22 and application 20 in the example of FIG. 1 are shown in RAM 14, but many components of such software typically are stored in non-volatile memory also, e.g., on a disk drive 24.

As will become more apparent below, embodiments consistent with the invention may be implemented within Network On Chip (NOC) integrated circuit devices, or chips, and as such, computer 10 is illustrated including two exemplary NOCs: a video adapter 26 and a coprocessor 28. NOC video adapter 26, which may alternatively be referred to as a graphics adapter, is an example of an I/O adapter specially designed for graphic output to a display device 30 such as a display screen or computer monitor. NOC video adapter 26 is connected to processor 12 through a high speed video bus 32, bus adapter 18, and the front side bus 34, which is also a high speed bus. NOC Coprocessor 28 is connected to processor 12 through bus adapter 18, and front side buses 34 and 36, which is also a high speed bus. The NOC coprocessor of FIG. 1 may be optimized, for example, to accelerate particular data processing tasks at the behest of the main processor 12.

The exemplary NOC video adapter 26 and NOC coprocessor 28 of FIG. 1 each include a NOC, including integrated processor ('IP') blocks, routers, memory communications controllers, and network interface controllers, the details of which will be discussed in greater detail below in connection with FIGS. 2-3. The NOC video adapter and NOC coprocessor are each optimized for programs that use parallel processing and also require fast random access to shared memory. It will be appreciated by one of ordinary skill in the art having the benefit of the instant disclosure, however, that the invention may be implemented in devices and device architectures other than NOC devices and device architectures. The invention is therefore not limited to implementation within an NOC device.

Computer 10 of FIG. 1 includes disk drive adapter 38 coupled through an expansion bus 40 and bus adapter 18 to processor 12 and other components of the computer 10. Disk drive adapter 38 connects non-volatile data storage to the computer 10 in the form of disk drive 24, and may be implemented, for example, using Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

Computer 10 also includes one or more input/output ('I/O') adapters 42, which implement user-oriented input/output through, for example, software drivers and computer hardware for controlling output to display devices such as computer display screens, as well as user input from user input devices 44 such as keyboards and mice. In addition, computer 10 includes a communications adapter 46 for data communications with other computers 48 and for data communications with a data communications network 50. Such data communications may be carried out serially through RS-232 connections, through external buses such as a Universal Serial Bus ('USB'), through data communications data communications networks such as IP data communications networks, and in other ways as will occur to those of skill in the art. Communications adapters implement the hardware level of data communications through which one computer sends data communications to another computer, directly or through a data communications network. Examples of communications adapters suitable for use in computer 10 include modems for wired dial-up communications, Ethernet (IEEE 802.3) adapters for wired data communications network communications, and 802.11 adapters for wireless data communications network communications.

Figure 2:
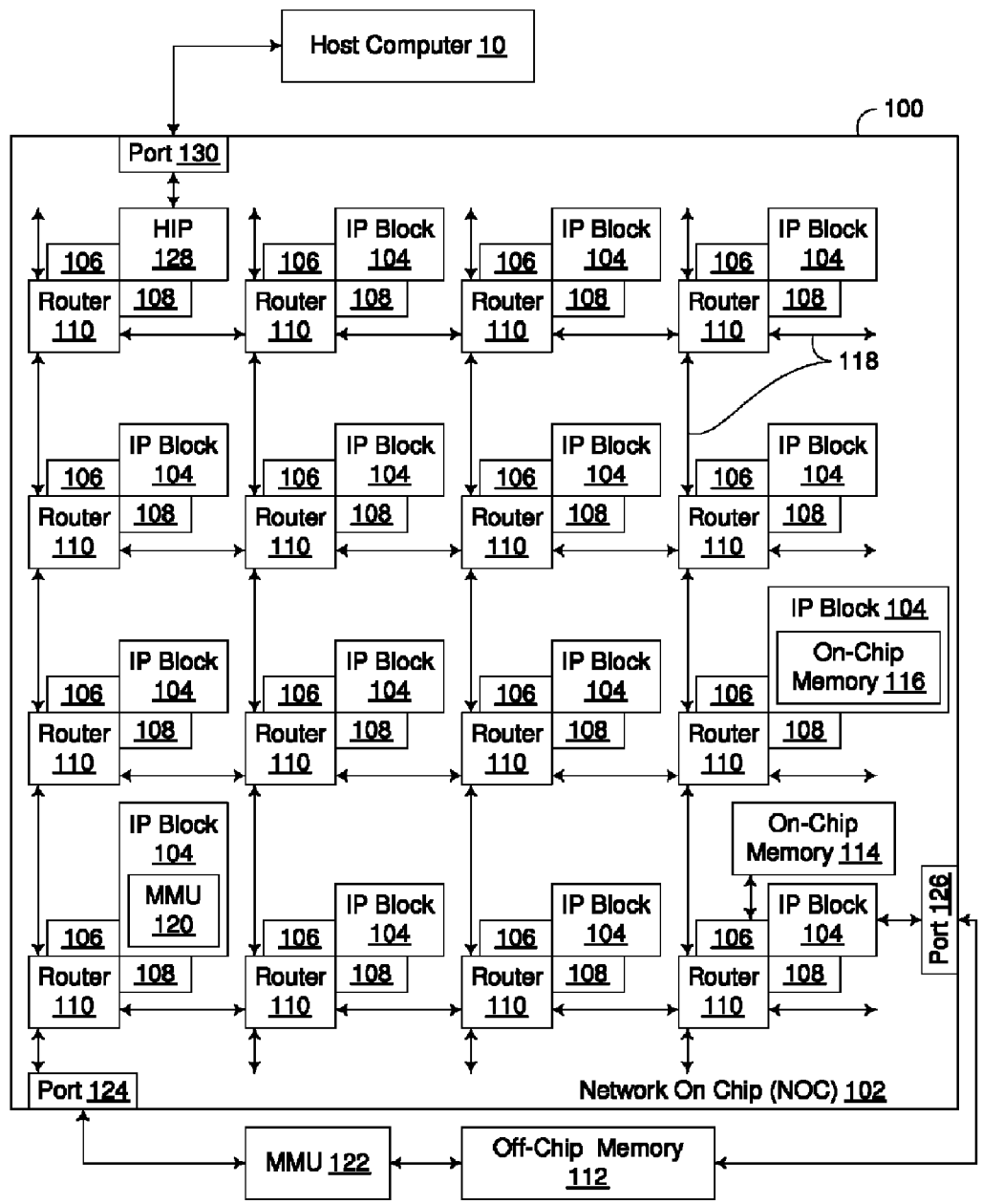
FIG. 2 is a block diagram of an exemplary NOC implemented in the computer of FIG. 1.

For further explanation, FIG. 2 sets forth a functional block diagram of an example NOC 102 according to embodiments of the present invention. The NOC in FIG. 2 is implemented on a 'chip' 100, that is, on an integrated circuit. NOC 102 includes integrated processor ('IP') blocks 104, routers 110, memory communications controllers 106, and network interface controllers 108 grouped into interconnected nodes. Each IP block 104 is adapted to a router 110 through a memory communications controller 106 and a network interface controller 108. Each memory communications controller controls communications between an IP block and memory, and each network interface controller 108 controls inter-IP block communications through routers 110.

In NOC 102, each IP block represents a reusable unit of synchronous or asynchronous logic design used as a building block for data processing within the NOC. The term 'IP block' is sometimes expanded as 'intellectual property block,' effectively designating an IP block as a design that is owned by a party, that is the intellectual property of a party, to be licensed to other users or designers of semiconductor circuits. In the scope of the present invention, however, there is no requirement that IP blocks be subject to any particular ownership, so the term is always expanded in this specification as 'integrated processor block.' IP blocks, as specified here, are reusable units of logic, cell, or chip layout design that may or may not be the subject of intellectual property. IP blocks are logic cores that can be formed as ASIC chip designs or FPGA logic designs.

One way to describe IP blocks by analogy is that IP blocks are for NOC design what a library is for computer programming or a discrete integrated circuit component is for printed circuit board design. In NOCs consistent with embodiments of the present invention, IP blocks may be implemented as generic gate netlists, as complete special purpose or general purpose microprocessors, or in other ways as may occur to those of skill in the art. A netlist is a Boolean-algebra representation (gates, standard cells) of an IP block's logical-function, analogous to an assembly-code listing for a high-level program application. NOCs also may be implemented, for example, in synthesizable form, described in a hardware description language such as Verilog or VHDL. In addition to netlist and synthesizable implementation, NOCs also may be delivered in lower-level, physical descriptions. Analog IP block elements such as SERDES, PLL, DAC, ADC, and so on, may be distributed in a transistor-layout format such as GDSII. Digital elements of IP blocks are sometimes offered in layout format as well. It will also be appreciated that IP blocks, as well as other logic circuitry implemented consistent with the invention may be distributed in the form of computer data files, e.g., logic definition program code, that define at various levels of detail the functionality and/or layout of the circuit arrangements implementing such logic. Thus, while the invention has and hereinafter will be described in the context of circuit arrangements implemented in fully functioning integrated circuit devices and data processing systems utilizing such devices, those of ordinary skill in the art having the benefit of the instant disclosure will appreciate that circuit arrangements consistent with the invention are capable of being distributed as program products in a variety of forms, and that the invention applies equally regardless of the particular type of computer readable or signal bearing media being used to actually carry out the distribution. Examples of computer readable or signal bearing media include, but are not limited to, physical, recordable type media such as volatile and non-volatile memory devices, floppy disks, hard disk drives, CD-ROMs, and DVDs (among others), and transmission type media such as digital and analog communication links.

Each IP block 104 in the example of FIG. 2 is adapted to a router 110 through a memory communications controller 106. Each memory communication controller is an aggregation of synchronous and asynchronous logic circuitry adapted to provide data communications between an IP block and memory. Examples of such communications between IP blocks and memory include memory load instructions and memory store instructions. The memory communications controllers 106 are described in more detail below with reference to FIG. 3. Each IP block 104 is also adapted to a router 110 through a network interface controller 108, which controls communications through routers 110 between IP blocks 104. Examples of communications between IP blocks include messages carrying data and instructions for processing the data among IP blocks in parallel applications and in pipelined applications. The network interface controllers 108 are also described in more detail below with reference to FIG. 3.

Routers 110, and the corresponding links 118 therebetween, implement the network operations of the NOC. The links 118 may be packet structures implemented on physical, parallel wire buses connecting all the routers. That is, each link may be implemented on a wire bus wide enough to accommodate simultaneously an entire data switching packet, including all header information and payload data. If a packet structure includes 64 bytes, for example, including an eight byte header and 56 bytes of payload data, then the wire bus subtending each link is 64 bytes wide, 512 wires. In addition, each link may be bidirectional, so that if the link packet structure includes 64 bytes, the wire bus actually contains 1024 wires between each router and each of its neighbors in the network. In such an implementation, a message could include more than one packet, but each packet would fit precisely onto the width of the wire bus. In the alternative, a link may be implemented on a wire bus that is only wide enough to accommodate a portion of a packet, such that a packet would be broken up into multiple beats, e.g., so that if a link is implemented as 16 bytes in width, or 128 wires, a 64 byte packet could be broken into four beats. It will be appreciated that different implementations may used different bus widths based on practical physical limits as well as desired performance characteristics. If the connection between the router and each section of wire bus is referred to as a port, then each router includes five ports, one for each of four directions of data transmission on the network and a fifth port for adapting the router to a particular IP block through a memory communications controller and a network interface controller.

Each memory communications controller 106 controls communications between an IP block and memory. Memory can include off-chip main RAM 112, memory 114 connected directly to an IP block through a memory communications controller 106, on-chip memory enabled as an IP block 116, and on-chip caches. In NOC 102, either of the on-chip memories 114, 116, for example, may be implemented as on-chip cache memory. All these forms of memory can be disposed in the same address space, physical addresses or virtual addresses, true even for the memory attached directly to an IP block. Memory addressed messages therefore can be entirely bidirectional with respect to IP blocks, because such memory can be addressed directly from any IP block anywhere on the network. Memory 116 on an IP block can be addressed from that IP block or from any other IP block in the NOC. Memory 114 attached directly to a memory communication controller can be addressed by the IP block that is adapted to the network by that memory communication controller—and can also be addressed from any other IP block anywhere in the NOC.

NOC 102 includes two memory management units ('MMUs') 120, 122, illustrating two alternative memory architectures for NOCs consistent with embodiments of the present invention. MMU 120 is implemented within an IP block, allowing a processor within the IP block to operate in virtual memory while allowing the entire remaining architecture of the NOC to operate in a physical memory address space. MMU 122 is implemented off-chip, connected to the NOC through a data communications port 124. The port 124 includes the pins and other interconnections required to conduct signals between the NOC and the MMU, as well as sufficient intelligence to convert message packets from the NOC packet format to the bus format required by the external MMU 122. The external location of the MMU means that all processors in all IP blocks of the NOC can operate in virtual memory address space, with all conversions to physical addresses of the off-chip memory handled by the off-chip MMU 122.

In addition to the two memory architectures illustrated by use of the MMUs 120, 122, data communications port 126 illustrates a third memory architecture useful in NOCs capable of being utilized in embodiments of the present invention. Port 126 provides a direct connection between an IP block 104 of the NOC 102 and off-chip memory 112. With no MMU in the processing path, this architecture provides utilization of a physical address space by all the IP blocks of the NOC. In sharing the address space bi-directionally, all the IP blocks of the NOC can access memory in the address space by memory-addressed messages, including loads and stores, directed through the IP block connected directly to the port 126. The port 126 includes the pins and other interconnections required to conduct signals between the NOC and the off-chip memory 112, as well as sufficient intelligence to convert message packets from the NOC packet format to the bus format required by the off-chip memory 112.

In the example of FIG. 2, one of the IP blocks is designated a host interface processor 128. A host interface processor 128 provides an interface between the NOC and a host computer 10 in which the NOC may be installed and also provides data processing services to the other IP blocks on the NOC, including, for example, receiving and dispatching among the IP blocks of the NOC data processing requests from the host computer. A NOC may, for example, implement a video graphics adapter 26 or a coprocessor 28 on a larger computer 10 as described above with reference to FIG. 1. In the example of FIG. 2, the host interface processor 128 is connected to the larger host computer through a data communications port 130. The port 130 includes the pins and other interconnections required to conduct signals between the NOC and the host computer, as well as sufficient intelligence to convert message packets from the NOC to the bus format required by the host computer 10. In the example of the NOC coprocessor in the computer of FIG. 1, such a port would provide data communications format translation between the link structure of the NOC coprocessor 28 and the protocol required for the front side bus 36 between the NOC coprocessor 28 and the bus adapter 18.

Figure 3:
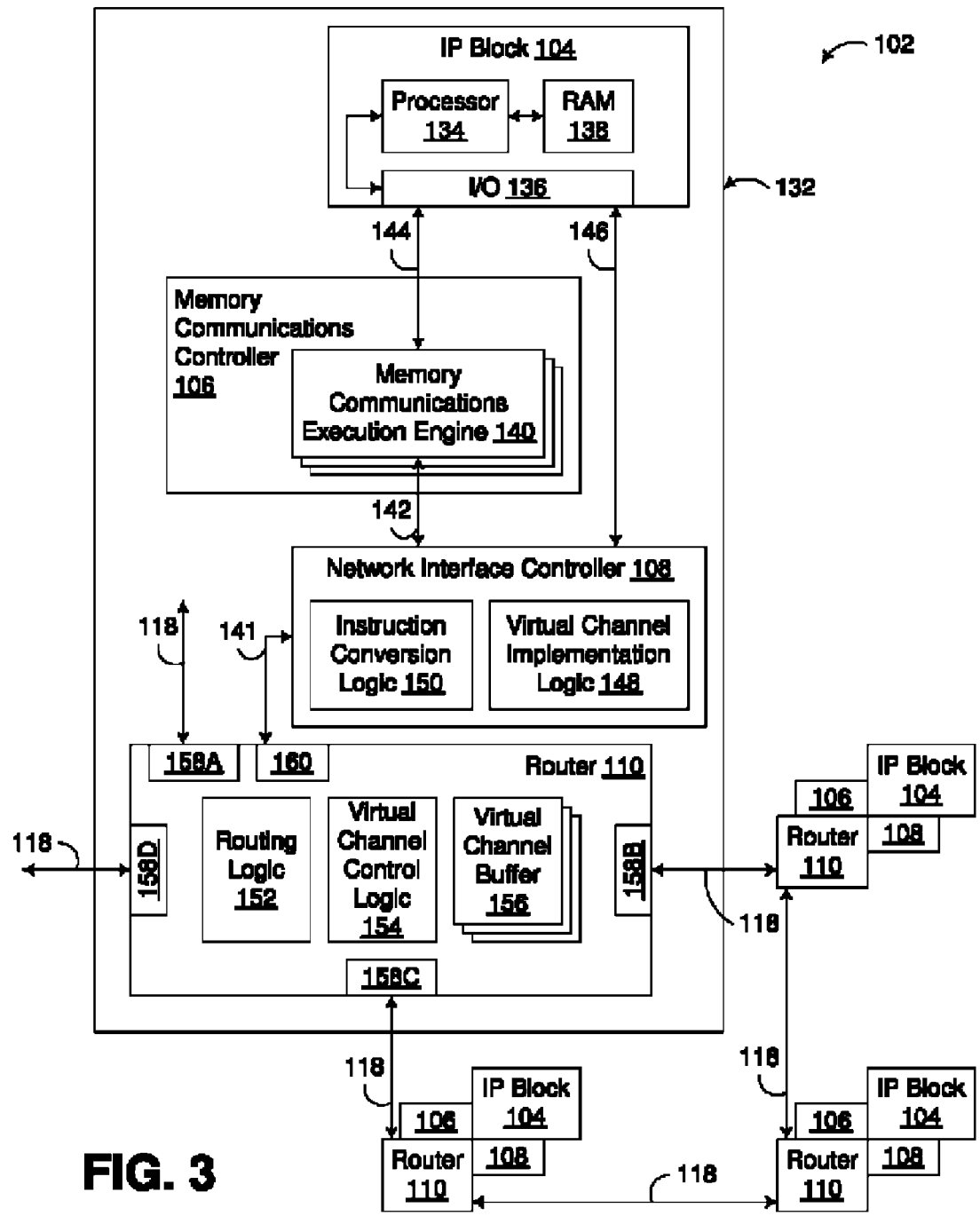
FIG. 3 is a block diagram illustrating in greater detail an exemplary implementation of a node from the NOC of FIG. 2.

FIG. 3 next illustrates a functional block diagram illustrating in greater detail the components implemented within an IP block 104, memory communications controller 106, network interface controller 108 and router 110 in NOC 102, collectively illustrated at 132. IP block 104 includes a computer processor 134 and I/O functionality 136. In this example, computer memory is represented by a segment of random access memory ('RAM') 138 in IP block 104. The memory, as described above with reference to FIG. 2, can occupy segments of a physical address space whose contents on each IP block are addressable and accessible from any IP block in the NOC. The processors 134, I/O capabilities 136, and memory 138 in each IP block effectively implement the IP blocks as generally programmable microcomputers. As explained above, however, in the scope of the present invention, IP blocks generally represent reusable units of synchronous or asynchronous logic used as building blocks for data processing within a NOC. Implementing IP blocks as generally programmable microcomputers, therefore, although a common embodiment useful for purposes of explanation, is not a limitation of the present invention.

In NOC 102 of FIG. 3, each memory communications controller 106 includes a plurality of memory communications execution engines 140. Each memory communications execution engine 140 is enabled to execute memory communications instructions from an IP block 104, including bidirectional memory communications instruction flow 141, 142, 144 between the network and the IP block 104. The memory communications instructions executed by the memory communications controller may originate, not only from the IP block adapted to a router through a particular memory communications controller, but also from any IP block 104 anywhere in NOC 102. That is, any IP block in the NOC can generate a memory communications instruction and transmit that memory communications instruction through the routers of the NOC to another memory communications controller associated with another IP block for execution of that memory communications instruction. Such memory communications instructions can include, for example, translation lookaside buffer control instructions, cache control instructions, barrier instructions, and memory load and store instructions.

Each memory communications execution engine 140 is enabled to execute a complete memory communications instruction separately and in parallel with other memory communications execution engines. The memory communications execution engines implement a scalable memory transaction processor optimized for concurrent throughput of memory communications instructions. Memory communications controller 106 supports multiple memory communications execution engines 140 all of which run concurrently for simultaneous execution of multiple memory communications instructions. A new memory communications instruction is allocated by the memory communications controller 106 to a memory communications engine 140 and memory communications execution engines 140 can accept multiple response events simultaneously. In this example, all of the memory communications execution engines 140 are identical. Scaling the number of memory communications instructions that can be handled simultaneously by a memory communications controller 106, therefore, is implemented by scaling the number of memory communications execution engines 140.

In NOC 102 of FIG. 3, each network interface controller 108 is enabled to convert communications instructions from command format to network packet format for transmission among the IP blocks 104 through routers 110. The communications instructions may be formulated in command format by the IP block 104 or by memory communications controller 106 and provided to the network interface controller 108 in command format. The command format may be a native format that conforms to architectural register files of IP block 104 and memory communications controller 106. The network packet format is typically the format required for transmission through routers 110 of the network. Each such message is composed of one or more network packets. Examples of such communications instructions that are converted from command format to packet format in the network interface controller include memory load instructions and memory store instructions between IP blocks and memory. Such communications instructions may also include communications instructions that send messages among IP blocks carrying data and instructions for processing the data among IP blocks in parallel applications and in pipelined applications.

In NOC 102 of FIG. 3, each IP block is enabled to send memory-address-based communications to and from memory through the IP block's memory communications controller and then also through its network interface controller to the network. A memory-address-based communications is a memory access instruction, such as a load instruction or a store instruction, that is executed by a memory communication execution engine of a memory communications controller of an IP block. Such memory-address-based communications typically originate in an IP block, formulated in command format, and handed off to a memory communications controller for execution.

Many memory-address-based communications are executed with message traffic, because any memory to be accessed may be located anywhere in the physical memory address space, on-chip or off-chip, directly attached to any memory communications controller in the NOC, or ultimately accessed through any IP block of the NOC—regardless of which IP block originated any particular memory-address-based communication. Thus, in NOC 102, all memory-address-based communications that are executed with message traffic are passed from the memory communications controller to an associated network interface controller for conversion from command format to packet format and transmission through the network in a message. In converting to packet format, the network interface controller also identifies a network address for the packet in dependence upon the memory address or addresses to be accessed by a memory-address-based communication. Memory address based messages are addressed with memory addresses. Each memory address is mapped by the network interface controllers to a network address, typically the network location of a memory communications controller responsible for some range of physical memory addresses. The network location of a memory communication controller 106 is naturally also the network location of that memory communication controller's associated router 110, network interface controller 108, and IP block 104. The instruction conversion logic 150 within each network interface controller is capable of converting memory addresses to network addresses for purposes of transmitting memory-address-based communications through routers of a NOC.

Upon receiving message traffic from routers 110 of the network, each network interface controller 108 inspects each packet for memory instructions. Each packet containing a memory instruction is handed to the memory communications controller 106 associated with the receiving network interface controller, which executes the memory instruction before sending the remaining payload of the packet to the IP block for further processing. In this way, memory contents are always prepared to support data processing by an IP block before the IP block begins execution of instructions from a message that depend upon particular memory content.

In NOC 102 of FIG. 3, each IP block 104 is enabled to bypass its memory communications controller 106 and send inter-IP block, network-addressed communications 146 directly to the network through the IP block's network interface controller 108. Network-addressed communications are messages directed by a network address to another IP block. Such messages transmit working data in pipelined applications, multiple data for single program processing among IP blocks in a SIMD application, and so on, as will occur to those of skill in the art. Such messages are distinct from memory-address-based communications in that they are network addressed from the start, by the originating IP block which knows the network address to which the message is to be directed through routers of the NOC. Such network-addressed communications are passed by the IP block through I/O functions 136 directly to the IP block's network interface controller in command format, then converted to packet format by the network interface controller and transmitted through routers of the NOC to another IP block. Such network-addressed communications 146 are bi-directional, potentially proceeding to and from each IP block of the NOC, depending on their use in any particular application. Each network interface controller, however, is enabled to both send and receive such communications to and from an associated router, and each network interface controller is enabled to both send and receive such communications directly to and from an associated IP block, bypassing an associated memory communications controller 106.

Each network interface controller 108 in the example of FIG. 3 is also enabled to implement virtual channels on the network, characterizing network packets by type. Each network interface controller 108 includes virtual channel implementation logic 148 that classifies each communication instruction by type and records the type of instruction in a field of the network packet format before handing off the instruction in packet form to a router 110 for transmission on the NOC. Examples of communication instruction types include inter-IP block network-address-based messages, request messages, responses to request messages, invalidate messages directed to caches; memory load and store messages; and responses to memory load messages, etc.

Each router 110 in the example of FIG. 3 includes routing logic 152, virtual channel control logic 154, and virtual channel buffers 156. The routing logic typically is implemented as a network of synchronous and asynchronous logic that implements a data communications protocol stack for data communication in the network formed by the routers 110, links 118, and bus wires among the routers. Routing logic 152 includes the functionality that readers of skill in the art might associate in off-chip networks with routing tables, routing tables in at least some embodiments being considered too slow and cumbersome for use in a NOC. Routing logic implemented as a network of synchronous and asynchronous logic can be configured to make routing decisions as fast as a single clock cycle. The routing logic in this example routes packets by selecting a port for forwarding each packet received in a router. Each packet contains a network address to which the packet is to be routed.

In describing memory-address-based communications above, each memory address was described as mapped by network interface controllers to a network address, a network location of a memory communications controller. The network location of a memory communication controller 106 is naturally also the network location of that memory communication controller's associated router 110, network interface controller 108, and IP block 104. In inter-IP block, or network-address-based communications, therefore, it is also typical for application-level data processing to view network addresses as the location of an IP block within the network formed by the routers, links, and bus wires of the NOC. FIG. 2 illustrates that one organization of such a network is a mesh of rows and columns in which each network address can be implemented, for example, as either a unique identifier for each set of associated router, IP block, memory communications controller, and network interface controller of the mesh or x, y coordinates of each such set in the mesh.

In NOC 102 of FIG. 3, each router 110 implements two or more virtual communications channels, where each virtual communications channel is characterized by a communication type. Communication instruction types, and therefore virtual channel types, include those mentioned above: inter-IP block network-address-based messages, request messages, responses to request messages, invalidate messages directed to caches; memory load and store messages; and responses to memory load messages, and so on. In support of virtual channels, each router 110 in the example of FIG. 3 also includes virtual channel control logic 154 and virtual channel buffers 156. The virtual channel control logic 154 examines each received packet for its assigned communications type and places each packet in an outgoing virtual channel buffer for that communications type for transmission through a port to a neighboring router on the NOC.

Each virtual channel buffer 156 has finite storage space. When many packets are received in a short period of time, a virtual channel buffer can fill up—so that no more packets can be put in the buffer. In other protocols, packets arriving on a virtual channel whose buffer is full would be dropped. Each virtual channel buffer 156 in this example, however, is enabled with control signals of the bus wires to advise surrounding routers through the virtual channel control logic to suspend transmission in a virtual channel, that is, suspend transmission of packets of a particular communications type. When one virtual channel is so suspended, all other virtual channels are unaffected—and can continue to operate at full capacity. The control signals are wired all the way back through each router to each router's associated network interface controller 108. Each network interface controller is configured to, upon receipt of such a signal, refuse to accept, from its associated memory communications controller 106 or from its associated IP block 104, communications instructions for the suspended virtual channel. In this way, suspension of a virtual channel affects all the hardware that implements the virtual channel, all the way back up to the originating IP blocks.

One effect of suspending packet transmissions in a virtual channel is that no packets are ever dropped. When a router encounters a situation in which a packet might be dropped in some unreliable protocol such as, for example, the Internet Protocol, the routers in the example of FIG. 3 may suspend by their virtual channel buffers 156 and their virtual channel control logic 154 all transmissions of packets in a virtual channel until buffer space is again available, eliminating any need to drop packets. The NOC of FIG. 3, therefore, may implement highly reliable network communications protocols with an extremely thin layer of hardware.

The example NOC of FIG. 3 may also be configured to maintain cache coherency between both on-chip and off-chip memory caches. Each NOC can support multiple caches each of which operates against the same underlying memory address space. For example, caches may be controlled by IP blocks, by memory communications controllers, or by cache controllers external to the NOC. Either of the on-chip memories 114, 116 in the example of FIG. 2 may also be implemented as an on-chip cache, and, within the scope of the present invention, cache memory can be implemented off-chip also.

Each router 110 illustrated in FIG. 3 includes five ports, four ports 158A-D connected through bus wires 118 to other routers and a fifth port 160 connecting each router to its associated IP block 104 through a network interface controller 108 and a memory communications controller 106. As can be seen from the illustrations in FIGS. 2 and 3, the routers 110 and the links 118 of the NOC 102 form a mesh network with vertical and horizontal links connecting vertical and horizontal ports in each router. In the illustration of FIG. 3, for example, ports 158A, 158C and 160 are termed vertical ports, and ports 158B and 158D are termed horizontal ports.

Figure 4:
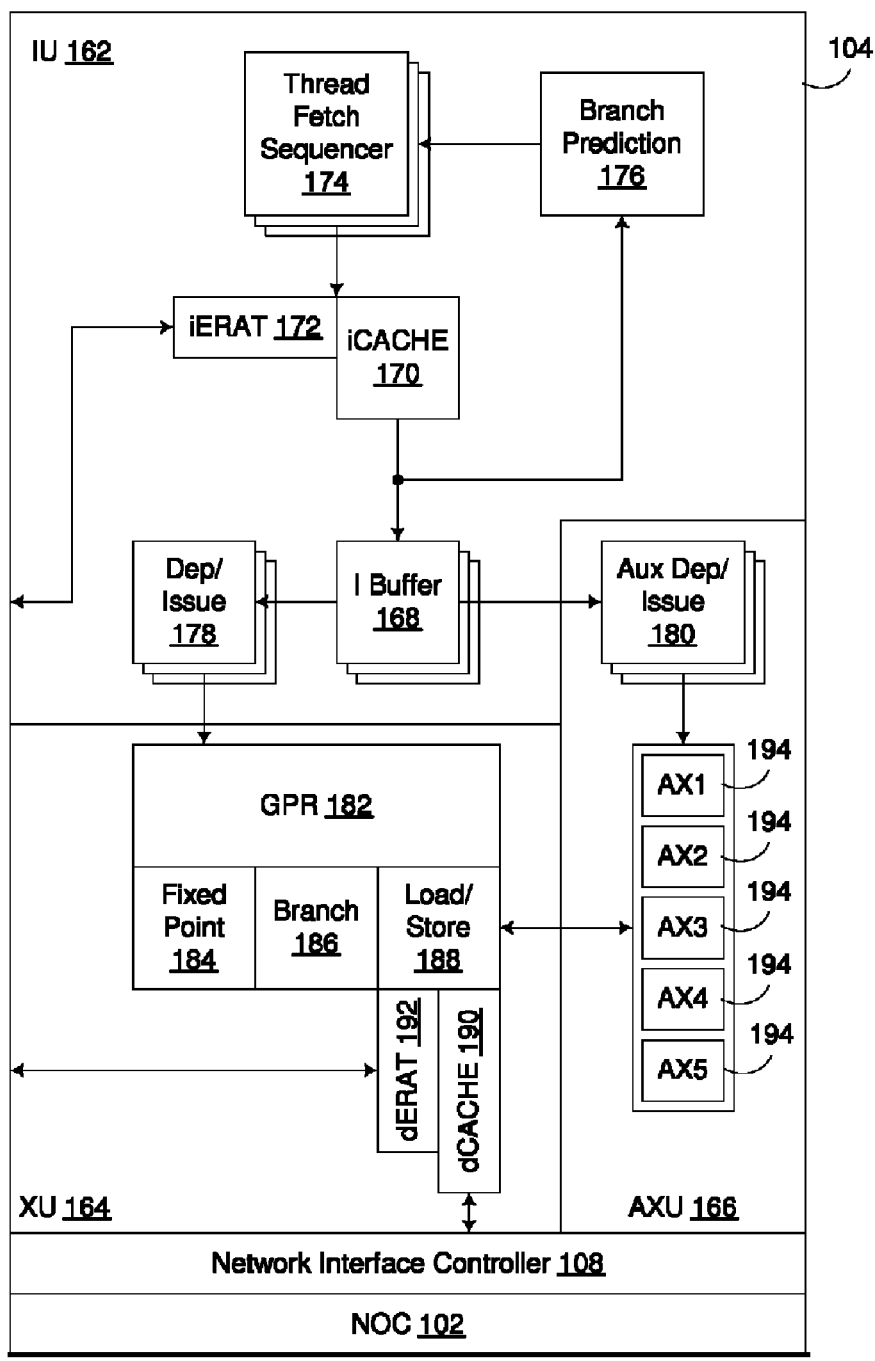
FIG. 4 is a block diagram illustrating an exemplary implementation of an IP block from the NOC of FIG. 2.

FIG. 4 next illustrates in another manner one exemplary implementation of an IP block 104 consistent with the invention, implemented as a processing element partitioned into an instruction unit (IU) 162, execution unit (XU) 164 and auxiliary execution unit (AXU) 166. In the illustrated implementation, IU 162 includes a plurality of instruction buffers 168 that receive instructions from an L1 instruction cache (iCACHE) 170. Each instruction buffer 168 is dedicated to one of a plurality, e.g., four, symmetric multithreaded (SMT) hardware threads. An effective-to-real translation unit (iERAT) 172 is coupled to iCACHE 170, and is used to translate instruction fetch requests from a plurality of thread fetch sequencers 174 into real addresses for retrieval of instructions from lower order memory. Each thread fetch sequencer 174 is dedicated to a particular hardware thread, and is used to ensure that instructions to be executed by the associated thread is fetched into the iCACHE for dispatch to the appropriate execution unit. As also shown in FIG. 4, instructions fetched into instruction buffer 168 may also be monitored by branch prediction logic 176, which provides hints to each thread fetch sequencer 174 to minimize instruction cache misses resulting from branches in executing threads.

IU 162 also includes a dependency/issue logic block 178 dedicated to each hardware thread, and configured to resolve dependencies and control the issue of instructions from instruction buffer 168 to XU 164. In addition, in the illustrated embodiment, separate dependency/issue logic 180 is provided in AXU 166, thus enabling separate instructions to be concurrently issued by different threads to XU 164 and AXU 166. In an alternative embodiment, logic 180 may be disposed in IU 162, or may be omitted in its entirety, such that logic 178 issues instructions to AXU 166.

XU 164 is implemented as a fixed point execution unit, including a set of general purpose registers (GPR's) 182 coupled to fixed point logic 184, branch logic 186 and load/store logic 188. Load/store logic 188 is coupled to an L1 data cache (dCACHE) 190, with effective to real translation provided by dERAT logic 192. XU 164 may be configured to implement practically any instruction set, e.g., all or a portion of a 32 b or 64 b PowerPC instruction set.

AXU 166 operates as an auxiliary execution unit including dedicated dependency/issue logic 180 along with one or more execution blocks 194. AXU 166 may include any number of execution blocks, and may implement practically any type of execution unit, e.g., a floating point unit, or one or more specialized execution units such as encryption/decryption units, coprocessors, vector processing units, graphics processing units, XML processing units, etc. In the illustrated embodiment, AXU 166 includes a high speed auxiliary interface to XU 164, e.g., to support direct moves between AXU architected state and XU architected state.

Communication with IP block 104 may be managed in the manner discussed above in connection with FIG. 2, via network interface controller 108 coupled to NOC 102. Address-based communication, e.g., to access L2 cache memory, may be provided, along with message-based communication. For example, each IP block 104 may include a dedicated in box and/or out box in order to handle inter-node communications between IP blocks.

Embodiments of the present invention may be implemented within the hardware and software environment described above in connection with FIGS. 1-4. However, it will be appreciated by one of ordinary skill in the art having the benefit of the instant disclosure that the invention may be implemented in a multitude of different environments, and that other modifications may be made to the aforementioned hardware and software embodiment without departing from the spirit and scope of the invention. As such, the invention is not limited to the particular hardware and software environment disclosed herein.

Software Pipelining

Figure 5:
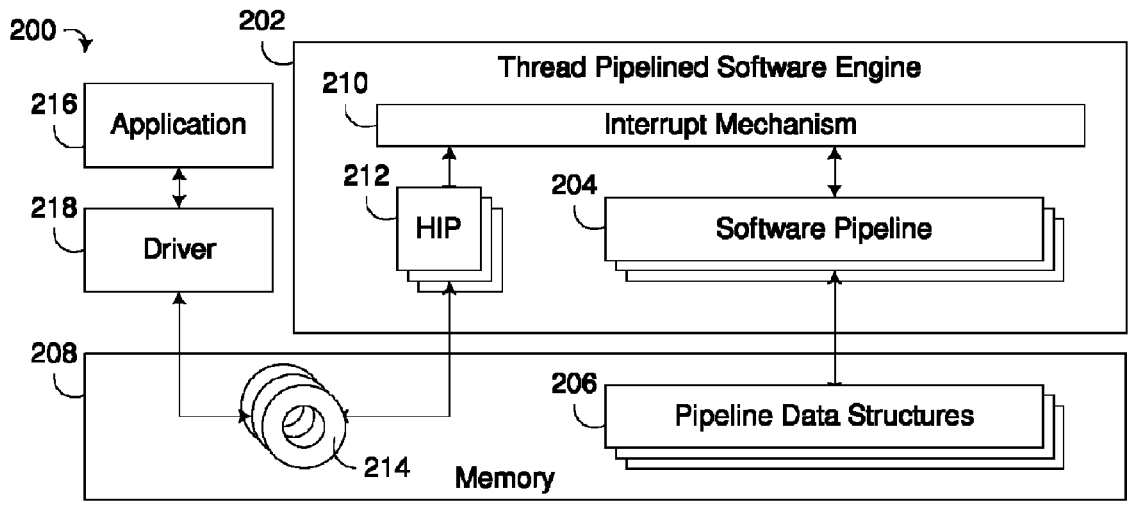
FIG. 5 is a block diagram of a thread pipelined software engine suitable for implementation in the NOC of FIG. 2.

Turning now to FIG. 5, NOC 102 may be used in some embodiments to implement a software-based pipeline. In particular, FIG. 5 illustrates an exemplary processing unit 200 incorporating a thread pipelined software engine 202 that may be used to implement and execute one or more software pipelines 204 on top of an NOC architecture. Each pipeline 204 is typically allocated one or more data structures 206 in a shared memory 208 to enable different stages of a pipeline to exchange data. Furthermore, an interrupt mechanism 210 is provided to enable stages of a pipeline to notify one another of pending work to be performed.

One or more host interface processors (HIP's) 212 are also provided in engine 202 to handle the issue of work to software pipelines 204. One or more push buffers 214 are provided to interface each HIP 212 with a software application 216 and driver 218, which are resident outside of the engine. In order to initiate work in a pipeline, a software application 216 issues requests through an appropriate driver 218 in the form of API calls, which then generates appropriate requests for the HIP and stores the requests in a push buffer 214. The HIP 212 for the relevant pipeline pulls work requests off of push buffer 214 and initiates processing of the request by the associated pipeline.

In the illustrated embodiment, and as implemented on a NOC 102, a software pipeline 204 implements a function that is segmented into a set of modules or 'stages' of computer program instructions that cooperate with one another to carry out a series of data processing tasks in sequence. Each stage in a pipeline is composed of a flexibly configurable module of computer program instructions identified by a stage ID with each stage executing on a thread of execution on an IP block 104 of a NOC 102. The stages are flexibly configurable in that each stage may support multiple instances of the stage, so that a pipeline may be scaled by instantiating additional instances of a stage as needed depending on workload. Because each stage is implemented by computer program instructions executing on an IP block 104 of a NOC 102, each stage is capable of accessing addressed memory through a memory communications controller 106. At least one stage, moreover, is capable of sending network-address based communications among other stages, where the network-address based communications maintain packet order.

The network-address based communications, for example, may be implemented using "inboxes" in each stage that receive data and/or commands from preceding stages in the pipeline. The network-address based communications maintain packet order, and are communications of a same type which are able to flow through the same virtual channel as described above. Each packet in such communications is routed by a router 110 in the manner described above, entering and leaving a virtual channel buffer in sequence, in FIFO order, thereby maintaining strict packet order and preserving message integrity.

Each stage implements a producer/consumer relationship with a next stage. The first stage receives work instructions and work piece data through a HIP 212, carries out its designated data processing tasks on the work piece, produces output data, and sends the produced output data to the next stage in the pipeline, which consumes the produced output data from the first stage by carrying out its designated data processing tasks on the produced output data from the first stage, thereby producing output data that is subsequently sent on to a next stage in the pipeline. This sequence of operations continues to the last stage of the pipeline, which then stores its produced output data in an output data structure for eventual return through the HIP 212 to the originating application 216.

Figure 6:
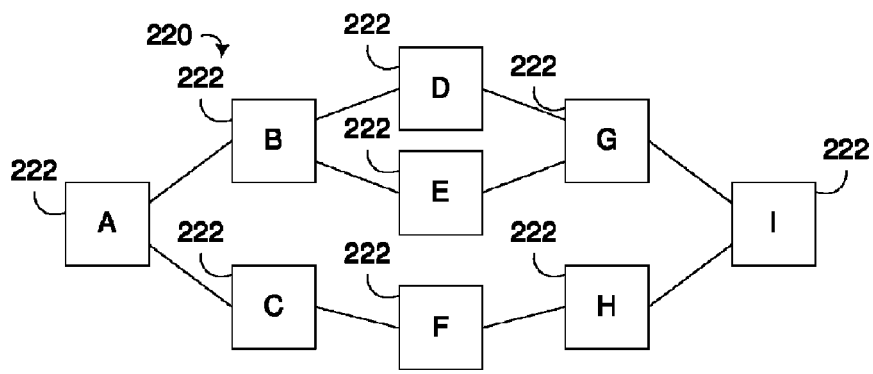
FIG. 6 is a block diagram of an exemplary software pipeline suitable for implementation in the thread pipelined software engine of FIG. 5.

The arrangement of stages in a pipeline may vary in different embodiments, as well as for performing different functions in different applications. FIG. 6, for example, illustrates an exemplary software pipeline 220 including a plurality of stage instances 222, also separately designated as instances A-I, each of which representing a thread of execution implemented on an IP block in NOC 102. The stage instances 222 are arranged in pipeline 220 into five stages, a first stage with instance A, a second stage with instances B and C, a third stage with instances D, E and F, a fourth stage with instances G and H, and a fifth stage with instance I. As can be seen from FIG. 6, instances may have a one-to-one, a one-to-many and/or a many-to-one relationship with other instances in the pipeline. Instances may operate collectively with one another in a particular stage to perform parallel tasks and share the workload, thus improving the overall throughput of the stage in performing the task. Instances in a stage may also perform different tasks from one another to enable the parallel performance of different tasks. Instances can supply data to more than one instance, while other instances may collect data and process data from multiple instances.

In the illustrated embodiment, each instance of each stage of a pipeline is typically implemented as an application-level module of computer program instructions executed on a separate IP block on a NOC, and each stage is assigned to a thread of execution on an IP block of a NOC. Each stage is assigned a stage ID, and each instance of a stage is assigned an identifier. HIP 212 (FIG. 5) typically sets up the pipeline by configuring each stage with a desired number of instances, with the network location of each instance of each stage provided to other instances of other stages to enable each instance to send its resultant workload to the proper instance in the next stage. earlier and/or later stage 3 to which an instance of stage 2 is authorized to send its resultant workload. Multiple instances may be assigned to a particular stage to provide additional processing resources relative to other stages, e.g., so work flows through the pipeline as efficiently as possible, and no single stage presents a bottleneck to performance. It will also be appreciated that workload monitoring may be performed during runtime, and that instances may be dynamically added or removed from a stage as needed for balancing the load among the stages of the pipeline.

Each stage is configured with a stage ID for each instance of a next stage, which may also include the number of instances in the next stage as well as the network location of each instance of that. Configuring a stage with IDs for instances of a next stage provides the stage with the information needed to carry out load balancing across stages. Such load balancing can be carried out, for example, by monitoring the performance of the stages and instantiating a number of instances of each stage in dependence upon the performance of one or more of the stages. Monitoring the performance of the stages can be carried out by configuring each stage to report performance statistics to a separate monitoring application that in turn is installed and running on another thread of execution on an IP block or HIP. Performance statistics can include, for example, time required to complete a data processing task, a number of data processing tasks completed within a particular time period, and so on, as will occur to those of skill in the art. Instantiating a number of instances of each stage in dependence upon the performance of one or more of the stages can be carried out by instantiating, by an HIP, a new instance of a stage when monitored performance indicates a need for a new instance.

Figure 7:
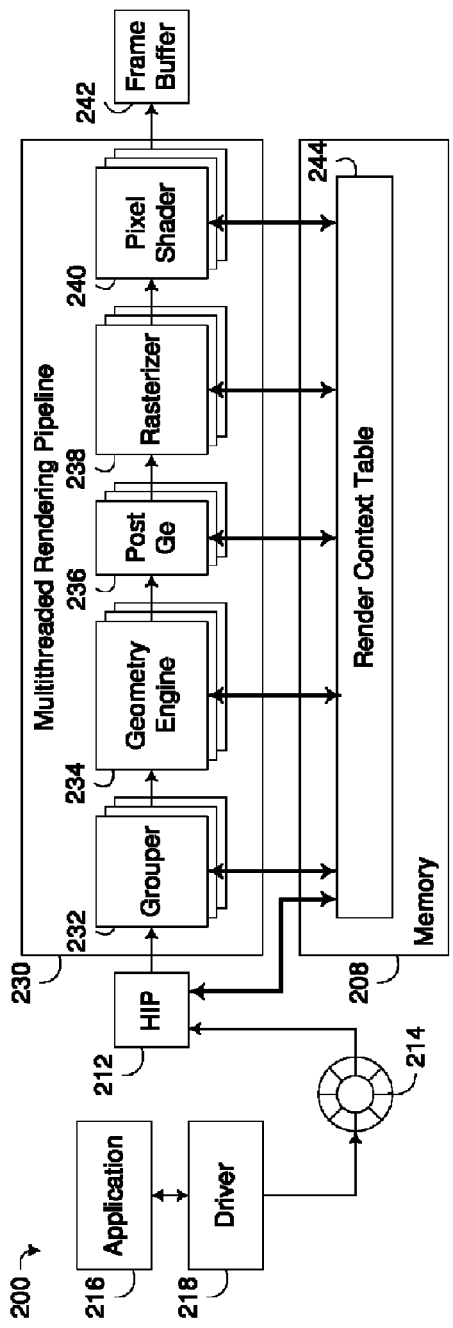
FIG. 7 is a block diagram of a processing unit including an exemplary multithreaded rendering pipeline incorporating a rolling context data structure consistent with the invention, and suitable for implementation in the thread pipelined software engine of FIG. 5.

Multithreaded Rendering Pipeline Architecture with Rolling Context Data Structure Now turning to FIG. 7, this figure illustrates an implementation of processing unit 200 configured to implement a multithreaded rendering pipeline architecture consistent with the invention. In particular, FIG. 7 illustrates a multithreaded rendering pipeline 230 incorporating a grouper stage with one or more grouper units 232, a geometry engine stage with one or more geometry engines 234, a post geometry engine (Post GE) stage including one or more post GE units 236, a rasterizer stage including one or more rasterizers 238 and pixel shading stage including one or more pixel shaders 240.

Each processing element or unit 232, 234, 236, 238, 240 is desirably implemented within an IP block in a node in NOC 102, with each such unit assigned at least one dedicated hardware thread. Each unit is typically disposed on a separate node, although in other embodiments multiple units may be disposed in a single node. Moreover, each unit may be allocated multiple threads of execution in some embodiments. Time-slice based software multithreading may also be implemented in some embodiments, although it is desirable in the illustrated embodiment that multiple units not be wholly implemented on the same hardware-based thread.

Each grouper unit 232 is used to group data for streaming down the pipeline, e.g., by pulling related vertices from an object array. Each geometry engine 234 is typically used to perform object transformations and generate the geometric primitives, while each post GE unit 236 is configured to perform post processing of the geometric primitives such as perspective divides, culling, sorting, breaking up geometry, etc.

Each rasterizer 238 is configured to operate as a pixel fragment generator to generate a stream of pixel fragment data sets that characterize one pixel, a fraction of one pixel or more than one pixel from a primitive input to the rasterizer. Among other operations, each rasterizer typically performs a scan line conversion of coordinates in a primitive to (u, v) texture coordinates in a texture to be applied to the primitive. Each pixel shader 240, in turn, takes the pixel fragment data sets and applies or updates the colors of one or more pixels in a frame buffer 242, typically using texture filtering and other shading techniques. It will be appreciated that the specific operations performed by units 232, 234, 236, 238 and 240 in terms of implementing a raster-based rendering pipeline that renders image data for a scene may incorporate any number of known rendering techniques, enhancements and algorithms, and that the implementation of such techniques in the appropriate units would be well within the abilities of one of ordinary skill in the art having the benefit of the instant disclosure. It will also be appreciated that other rendering algorithms, e.g., using physical rendering techniques such as ray tracing or photon mapping, may also be implemented in a multithreaded pipeline consistent with the invention, and that such techniques may rely on different and/or additional pipeline stages not illustrated in FIG. 7. Therefore, the invention is not limited to the particular raster-based rendering pipeline architecture represented in FIG. 7.

Commands and data may be passed from stage to stage in pipeline 230, while some data, including shared context or state data, is not passed directly from stage to stage, but is instead maintained in shared memory 208 and accessed by each stage as needed. Among this shared data may be included a rolling context data structure, implemented in FIG. 7 as a render context table 244.

Figure 8:
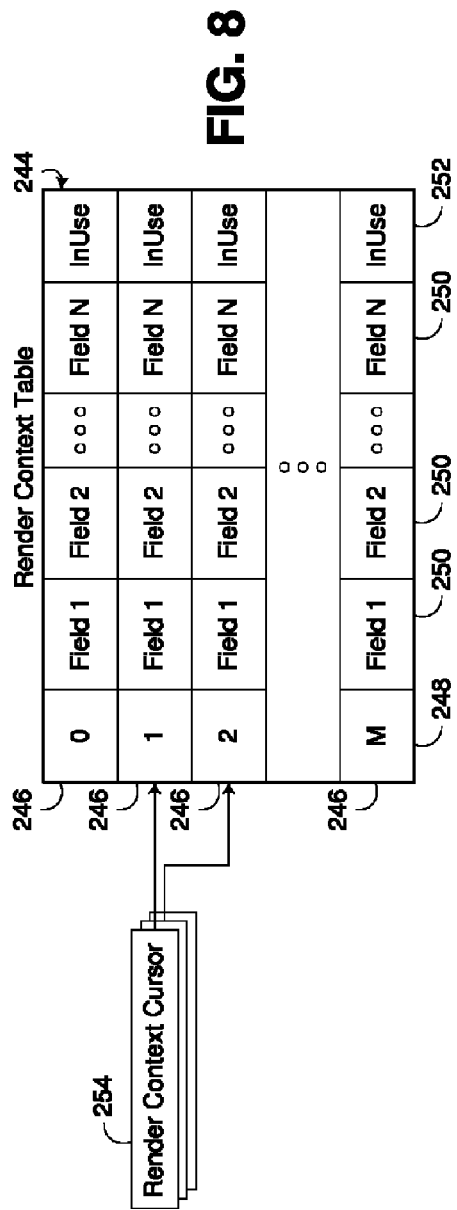
FIG. 8 is a diagram of an exemplary implementation of the render context table referenced in FIG. 7.

As shown in FIG. 8, one implementation of render context table 244 incorporates a plurality of entries 246, each including a key or index field 248, one or more attribute fields 250 and an inUse field 252. Key or index field 248 provides a unique identifier for its respective entry 246, and in the illustrated embodiment, field 248 stores an integer index, such that a render context cursor 254 may point to a particular entry 246 via an integer value. In some embodiments, field 248 may be omitted, e.g., where each entry 246 is of fixed size, such that the index for each entry is implied based upon its position in memory. It will also be appreciated that other identifiers may be used to identify an entry in table 244, and the invention is not limited to the use of an integer index to identify an entry in a table.

Each field 250 stores attribute data associated with a particular context or state represented by the respective entry 246. A fixed or variable number of fields 250 may be provided in each entry, and each field may store attribute data directory and/or pointers to other data structures containing relevant attribute data. For the purpose of graphical image processing, the types of state data that may be retained in a render context table entry may include, but are not limited to pointers to color buffers, pointers to sphere maps, pointers to texture maps, rotation attributes, lighting attributes, blending attributes, screen offsets, etc.

The inUse field 252 for each entry 246 is used to represent whether or not a particular entry is currently in use, or is free for modification and/or use in storing a different render context. Various manners of representing the status of an entry may be used consistent with the invention, including a single bit or flag, or another numerical value. In addition, a separate data structure could be used to store the status of each entry in table 244.

An in-use entry 246 in table 244 is typically pointed to by one or more render context cursors 254. A render context cursor 254 is typically associated with a particular image element, or set or group of image elements, for which it is desirable to maintain a particular state. Where each entry is identified by an integer, for example, a render context cursor 254 may store an integer value from a circular index that is incremented for each new render context, and that rolls over to point to the first entry whenever the last entry in the table is reached. As will be discussed in greater detail below, whenever a new state is required, and a new entry 246 is placed in use, a render context cursor 254 is set to point to the new entry, and is passed along with any streaming data for the particular image element or group of image elements such that the state can be accessed as the streaming data is passed among the stages of the software pipeline. Thus, for each unique image element or group of image elements that share a common state, a separate render context cursor 254 is maintained in order to provide a mechanism for accessing the state. It will be appreciated that a render context cursor may be represented in a number of manners, and may be streamed along with streaming data or stored in shared memory in different embodiments of the invention.

It will be appreciated that render context table 244 is but one of an innumerable number of different data structures that may be used to concurrently store multiple "snapshots" of state data used in a multithreaded software pipeline. The invention is therefore not limited to the particular implementation illustrated in FIG. 8.

Figure 9:
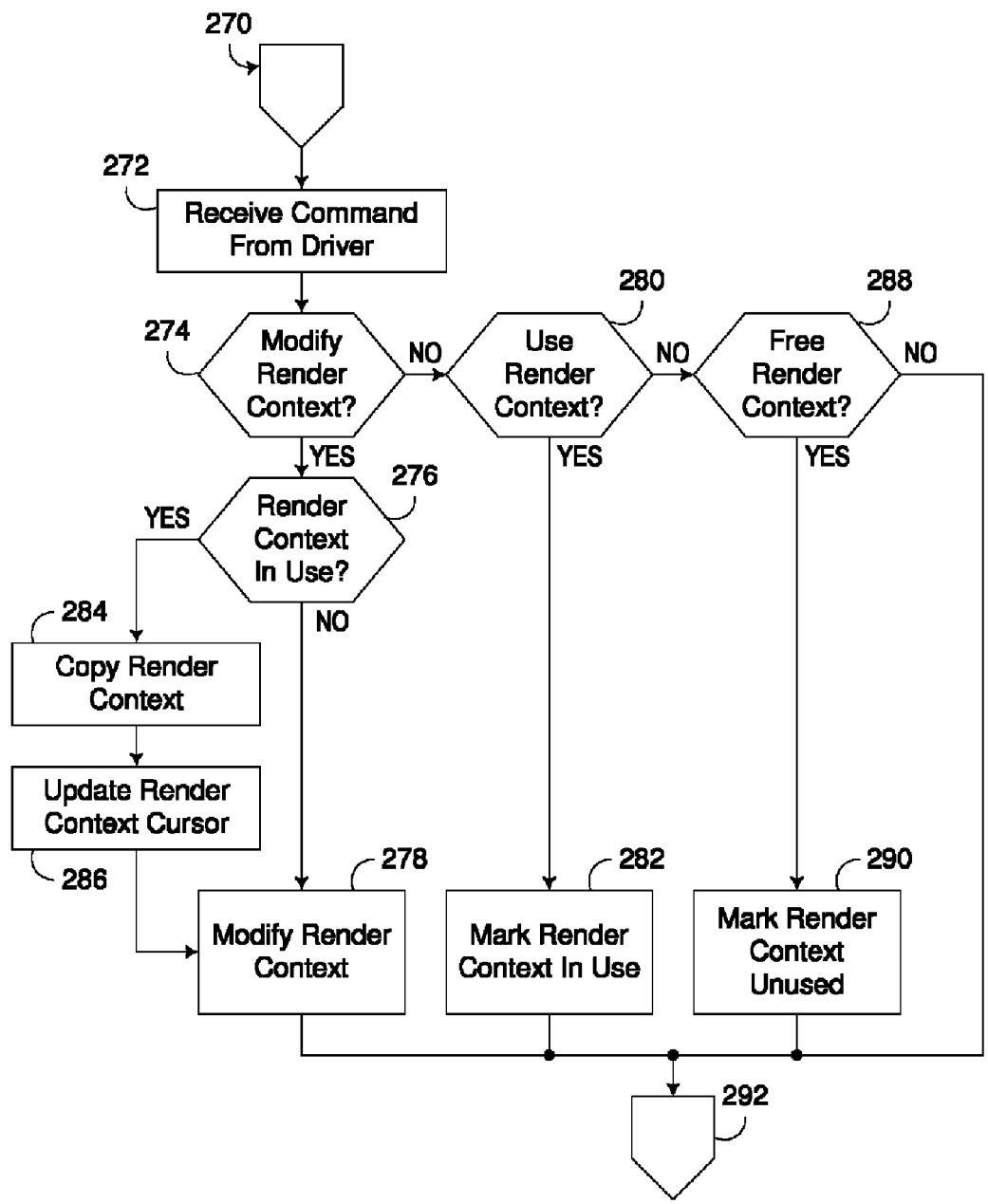
FIG. 9 is a flowchart illustrating the program flow of a command processing routine executed by the processing unit of FIG. 7.

FIG. 9 next illustrates a portion of a command processing routine 270 executed by processing unit 200, which illustrates the management of render contexts in multithreaded rendering software pipeline 230 of FIG. 7. Commands are typically received by HIP 212 (FIG. 7) from device driver 218 in response to functional calls generated by application 216, and certain such commands will typically require either the use or modification of a render context. These commands are processed in routine 270 to ensure that a consistent render context, or state, is maintained for one or more image elements as such elements are processed through pipeline 230.

In the illustrated embodiment, the illustrated steps in FIG. 9 are performed by HIP 212; however, in other embodiments, some or all of the steps may be performed by other logic, e.g., in a particular stage in multithreaded rendering software pipeline 230.

In software pipeline 230, image data is streamed from stage to stage in the form of one or more image elements. An image element may be as fundamental as a vertex, or may be collection of vertices representing a primitive or object. Multiple image elements may also be grouped together and processed collectively by the pipeline. Image elements are initially assigned to a current render context by HIP 212 prior to such image elements being processed in the software pipeline. Commands are generated by device driver 218 that are relevant to particular image elements or groups of image elements, and which result in HIP 212 initiating performance of such commands by various stages in the pipeline.

Thus, in routine 270, a command is received by HIP 212 from device driver 218 in block 272. A determination is made in block 274 as to whether the command will modify the current render context. A command that will modify a render context is typically a command that changes some state data associated with an image element or group of image elements for which a common state will be established as such elements are processed through pipeline 230. For example, commands such as glRotate, glTranslate, and glColor3f, among others, may modify render contexts when executed.

If the command will modify the current render context, control passes to block 276 to determine whether the current render context is currently in use, e.g., by checking the inUse field 252 for the render context table entry 246 pointed to by the render context cursor 254 associated with the image element(s) associated with the command (FIG. 8). In the event that the current render context is determined to not be in use, control passes to block 278 to modify the render context based upon the command. If the current render context is not in use, the modification of the render context may also incorporate resetting the data and/or initializing the data in the associated render context table entry 246. Routine 270 then completes processing of the command, as shown at block 292.

Setting a render context "in use" is performed in response to a command that attempts to use a render context, e.g., glVertex. Thus, returning to block 274, if the command will not modify the current render context, control passes to block 280 to determine whether the command will use the render context. If so, control passes to block 282 to mark the render context "in use" by setting the inUse field 252 in the table entry 246 pointed to by the render context cursor associated with the particular image element(s), then processing of the command continues at block 292.

Returning to block 276, if a command will modify the current render context, and that render context is currently in use, block 276 passes control to block 284 to replicate the current render context, e.g., by copying the data in the current render context table entry 246 to the next unused render context table entry 246 in table 244. Block 286 then updates the render context cursor for the image element(s) associated with the current command to point to the new render context, and control passes to block 278 to modify the new render context as appropriate for the command. As a result, the original render context, in use by another group of image elements being processed in the pipeline, retains its original state, and a new, modified state is created for the current group of image elements. It will be appreciated that in some embodiments, the use of a new render context for a group of image elements may not require the current render context to be copied into the new render context. It will also be appreciated that, whenever a last render context entry 246 in table 244 is reached when searching for an unused render context, the search will roll over to the first entry in the table. In addition, in some embodiments, an attempt to modify a render context may be processed by modifying the existing render context after replicating that render context to create a new render context.

To further illustrate the use and creation of render contexts, the exemplary OpenGl code discussed above is reproduced below:

```
glBegin(GL_TRIANGLES);
    glColor(0,255,0,255); // set color to green
    glVertex3f(100.0f, 100.0f, 0.0f);
    glColor(0,0,255,255); // set color to blue
    glVertex3f(150.0f, 100.0f, 0.0f);
    glColor(255,0,0,255); // set color to red
    Vertex3f(125.0f, 50.0f, 0.0f);
glEnd( );
```

Assume that upon initiating the execution of this code, no render context is currently in use. Upon receiving a command associated with the glColor(0,255,0,255) call, the command may be determined to modify the current render context, by virtue of setting the current color to green. Consequently, routine 270 may proceed through the path of blocks 272, 274, 276 and 278 to modify the current render context to set the current color to green. Then, upon receiving a command to define a vertex based on the glVertex3f(100.0f, 100.0f, 0.0f) call, routine 270 may proceed through the path of blocks 272, 274, 280 and 282 to set the current render context "in use", as the glVertex3f( ) call creates an image element that now uses the current render context.

Next, upon receiving a command associated with the glColor(0,0,255,255) call, the command may be determined to modify the current render context, by virtue of setting the current color to blue. However, since the current render context is now marked as being in use, routine 270 may proceed through the path of blocks 272, 274, 276, 284, 286 and 278 to create a new render context, copy the state data from the existing render context to the new render context, update the render context cursor to point to the new render context, and modify the new render context to set the current color to blue. Then, upon receiving a command to define a vertex based on the glVertex3f(150.0f, 100.0f, 0.0f) call, routine 270 may again proceed through the path of blocks 272, 274, 280 and 282 to set the new render context "in use", as the glVertex3f( ) call creates a second image element that now uses the new render context where the color is set to blue. Similarly, for the glColor(255,0,0,255) and Vertex3f(125.0f, 50.0f, 0.0f) calls, a new render context is created with a state in which the current color is set to red, and third image element uses that render context, resulting in each of the three vertices being processed through the pipeline with separate and independent states.

It will be appreciated that, from the standpoint of a multithreaded rendering software pipeline, the operation of routine 270 in processing commands from device driver 218 will ensure that image elements may be routed to different stages and instances of stages in the pipeline without a concern that the processing of other image elements will change the context or state used for such image elements. Different image elements can therefore be processed in parallel and in many instances without concern for completion order, thereby maximizing throughput through the pipeline, and minimizing serialization and contention conflicts. Routine 270, and the hardware upon which the routine is implemented, therefore functions as control logic that associates each image element with a render context in the render context table such that state data in a first context that is associated with a first image element is unaltered responsive to a change made to state data in a second context that is associated with a second image element during processing of the second image element by the multithreaded rendering software pipeline.

Returning to block 280 of FIG. 9, if a command does not use or modify a render context, control passes to block 288 to determine whether a render context should be freed or released. If so, control passes to block 290 to mark the relevant render context table entry unused, whereby control then proceeds to block 292. If no render context should be freed, block 288 bypasses block 290, and passes control directly to block 292.

In order to free or release render contexts, a number of techniques may be used. For example, a specific command may be generated to release a render context when it is known that render context will no longer be used. Such a command may be explicitly generated as a result of a function call by an application, or in the alternative, the fact that a render context will no longer be used may be detected and used to automatically free the render context. For example, HIP 212 may detect that a later command will modify the current render context, and tag a current command to indicate that the command will be the last command to use the current render context. For example, blocks 288 and 290 of FIG. 9 may be implemented within a particular stage in pipeline 230, e.g., in each rasterizer unit 238, such that, upon detecting a command that is flagged by the HIP to be the last command that will use the current render context, the rasterizer unit 238 will automatically free the render context in the manner described above. In the alternative, rasterizer unit 238 may detect a later command that changes the render context. As another alternative, the HIP may send a "flush" packet down the pipeline to free a particular render context. It will also be appreciated that other stages may have responsibility for freeing unused render contexts, although in many instances it is desirable to free render contexts in the last stage in which the state data represented by a render context could be used.

As another alternative, one or more counters may be used to track the usage of each render context. For example, a HIP may increment a "used' count whenever a render context is used by a command, while each rasterizer unit may increment a "free" count whenever a command that uses the render context has completed. Each rasterizer unit may then compare the used and free counts and automatically free a render context whenever the two counts are equal. In other embodiments, a single counter, incremented when a command uses the render context, and decremented when a command that uses the render context completes, may be used in lieu of separate counts. Other mechanisms for detecting and freeing unused render contexts will be apparent to one of ordinary skill in the art having the benefit of the instant disclosure.

In addition, various other modifications may be made without departing from the spirit and scope of the invention. Therefore, the invention lies in the claims hereinafter appended.

What is claimed is:

1. A circuit arrangement, comprising:
   hardware logic configured to host a multithreaded rendering software pipeline using a plurality of parallel threads of execution, the multithreaded rendering software pipeline including a plurality of stages configured to process a plurality of image elements to render an image in a buffer;
   a rolling context data structure accessible by the plurality of stages in the multithreaded rendering software pipeline, the rolling context data structure configured to store a plurality of contexts, each context configured to store state data for at least one image element as the at least one image element is processed by the plurality of stages of the multithreaded rendering software pipeline; and
   control logic configured to associate each image element with a context in the rolling context data structure such that state data in a first context that is associated with a first image element is unaltered responsive to a change made to state data in a second context that is associated with a second image element during processing of the second image element by the multithreaded rendering software pipeline.

2. The circuit arrangement of claim 1, wherein the second image element is received by the multithreaded rendering software pipeline after the first image element, and wherein the control logic is configured to:
   in response to the second image element being received by the multithreaded rendering software pipeline, initially associate the second image element with the first context; and
   in response to an attempt to modify the state data for the second image element while the first context is in use for the first image element, copy the state data from the first context to the second context, associate the second image element with the second context, and modify the state data stored in the second context.

3. The circuit arrangement of claim 2, wherein the control logic is further configured to, in response to the state data in the first context being used by the multithreaded rendering software pipeline for the first image element, marking the first context as being in use, and wherein the control logic is configured to copy the state data from the first context to the second context and associate the second image element with the second context in response to determining that the first context is marked as being in use.

4. The circuit arrangement of claim 3, wherein the control logic is further configured to mark the first context unused in response to determining that the first context is no longer in use.

5. The circuit arrangement of claim 2, wherein the control logic is further configured to:
   in response to a third image element being received by the multithreaded rendering software pipeline after the second image element, initially associate the third image element with the second context; and
   in response to an attempt to modify the state data for the third image element while the second context is not in use, modify the state data stored in the second context.

6. The circuit arrangement of claim 2, wherein the rolling context data structure comprises a rolling context table including a plurality of table entries, wherein each context is associated with a table entry in the rolling context data structure, and wherein each table entry includes an in use indicator that indicates whether a context associated with such table entry is currently in use.

7. The circuit arrangement of claim 6, wherein each table entry is associated with an entry identifier, wherein the control logic is configured to associate each image element with a context by associating each image element with the entry identifier for a table entry in the rolling context table, wherein the entry identifier for each image element is forwarded between the plurality of stages in the multithreaded rendering software pipeline along with streamed data associated with such image element.

8. The circuit arrangement of claim 7, wherein the table includes N table entries, wherein each entry identifier comprises an index value from a circular index.

9. The circuit arrangement of claim 1, wherein the control logic is configured to free the first context when the first context is no longer used by the multithreaded rendering software pipeline.

10. The circuit arrangement of claim 9, wherein the control logic is configured to free the first context in response to detecting an indicator set for a last command that will use the first context.

11. The circuit arrangement of claim 9, wherein the control logic is configured to free the first context in response to detecting a next command that will use the second context.

12. The circuit arrangement of claim 9, wherein the control logic is configured to free the first context in response to detecting a flush command processed by the multithreaded rendering software pipeline.

13. The circuit arrangement of claim 9, wherein the control logic is configured to increment a used count in response to receiving each command processed by the multithreaded rendering software pipeline that uses the first context, increment a free count in response to completion of processing of each command that uses the first context, and free the first context in response to the used count equaling the free count.

14. The circuit arrangement of claim 1, wherein the state data stored in each context includes a plurality of state attributes selected from the group consisting of a pointer to a color buffer, a pointer to a sphere map, a pointer to a texture map, a rotation attribute, a lighting attribute, a blending attribute, a screen offset, and combinations thereof.

15. The circuit arrangement of claim 1, wherein the first context is associated with a group of image elements.

16. The circuit arrangement of claim 1, wherein each image element is selected from the group consisting of a vertex, an object and combinations thereof.

17. An integrated circuit device including the circuit arrangement of claim 1.

18. A program product comprising a non-transitory computer readable medium and logic definition program code resident on the computer readable medium and defining the circuit arrangement of claim 1.

19. A method of rendering image data, the method comprising:
   rendering an image in a buffer by processing a plurality of image elements with a plurality of stages from a multithreaded rendering software pipeline executing on hardware logic that includes a plurality of parallel threads of execution;
   storing a plurality of contexts in a rolling context data structure accessible by the plurality of stages in the multithreaded rendering software pipeline, each context configured to store state data for at least one image element as the at least one image element is processed by the plurality of stages of the multithreaded rendering software pipeline; and
   associating each image element with a context in the rolling context data structure such that state data in a first context that is associated with a first image element is unaltered responsive to a change made to state data in a second context that is associated with a second image element during processing of the second image element by the multithreaded rendering software pipeline.

20. The method of claim 19, wherein the second image element is received by the multithreaded rendering software pipeline after the first image element, the method further comprising:
   in response to the second image element being received by the multithreaded rendering software pipeline, initially associating the second image element with the first context; and
   in response to an attempt to modify the state data for the second image element while the first context is in use for the first image element, copying the state data from the first context to the second context, associating the second image element with the second context, and modifying the state data stored in the second context.

21. The method of claim 20, further comprising in response to the state data in the first context being used by the multithreaded rendering software pipeline for the first image element, marking the first context as being in use, wherein copying the state data from the first context to the second context and associating the second image element with the second context are performed in response to determining that the first context is marked as being in use.

22. The method of claim 21, further comprising marking the first context unused in response to determining that the first context is no longer in use.

23. The method of claim 20, further comprising:
in response to a third image element being received by the multithreaded rendering software pipeline after the second image element, initially associating the third image element with the second context; and
in response to an attempt to modify the state data for the third image element while the second context is not in use, modifying the state data stored in the second context.

24. The method of claim 20, wherein the rolling context data structure comprises a rolling context table including a plurality of table entries, wherein each context is associated with a table entry in the rolling context data structure, wherein each table entry includes an in use indicator that indicates whether a context associated with such table entry is currently in use, wherein each table entry is associated with an entry identifier, wherein associating each image element with a context includes associating each image element with the entry identifier for a table entry in the rolling context table, wherein the entry identifier for each image element is forwarded between the plurality of stages in the multithreaded rendering software pipeline along with streamed data associated with such image element.

25. A method of rendering image data, the method comprising:
rendering an image in a buffer using a plurality of stages from a multithreaded rendering software pipeline executing on hardware logic that includes a plurality of parallel threads of execution;
receiving a first command associated with a first image element from among the plurality of image elements, wherein the first image element is associated with a first context from among a plurality of contexts in a rolling context data structure accessible by the plurality of stages in the multithreaded rendering software pipeline, wherein the first context stores state data for the first image element;
determining if the first command uses the first context, and if so, marking the first context as being in use;
receiving a second command associated with a second image element from among the plurality of image elements that is initially associated with the first context; and
determining if the second command attempts to modify state data in the first context and if the first context is marked as being in use, and if so, copying state data from the first context to a second context, associating the second image element with the second context, and modifying the state data in the second context.

* * * * *